United States Patent [19]
Langlois

[11] 3,869,280

[45] Mar. 4, 1975

[54] PROCESS FOR GOLD PRECIPITATION

[75] Inventor: Darwin James Langlois, Lewiston, N.Y.

[73] Assignee: E. I. du Pont de Nemours and Company, Wilmington, Del.

[22] Filed: Apr. 23, 1973

[21] Appl. No.: 353,913

[52] U.S. Cl. .................................. 75/.5 A, 75/118
[51] Int. Cl. .............................................. C22b 11/04
[58] Field of Search ............................ 75/.5 A, 118

[56] References Cited
UNITED STATES PATENTS

| | | | |
|---|---|---|---|
| 2,620,714 | 11/1971 | Short | 75/.5 A |
| 3,171,734 | 3/1965 | Berson | 75/.5 A |
| 3,505,134 | 4/1970 | Short | 252/514 X |
| 3,708,313 | 1/1973 | Short | 75/.5 A |
| 3,768,994 | 10/1973 | Daiga | 75/118 X |
| 3,816,097 | 6/1974 | Daiga | 75/.5 A |

Primary Examiner—L. Dewayne Rutledge
Assistant Examiner—Arthur J. Steiner

[57] ABSTRACT

An improved gold precipitation process is disclosed. In the reductive precipitation of gold from an aqueous solution of the chloride, agglomeration of the gold can be minimized by the use of small amounts of polyvinyl alcohol in the solution. The resultant fine, substantially nonagglomerated gold powder is useful to produce bright fired conductive patterns of gold on dielectric substrates, which gold does not bubble over a wide temperature range on being fired.

4 Claims, No Drawings

PROCESS FOR GOLD PRECIPITATION

BACKGROUND OF THE INVENTION

This application relates to a process for preparing gold powder and, more particularly, to a process for precipitating finely divided gold powder especially useful in the electronics industry.

Gold powders are used in a variety of commercial products, including thick-film compositions used to print and fire (sinter) resistors and conductors on dielectric substrates; compositions used to decorate glass; etc. (Thick-film techniques are well known in the art and are discussed, for example, in Handbook of Materials and Processes for Electronics, C. A. Harper, ed., McGraw-Hill, N.Y., 1970, Chapters 11 and 12.) Each of these compositions require a gold powder of certain characteristics suitable for the particular use.

There are many chemical methods of producing gold powders and each one may include variations involving pH, dilution, and temperature, among others. A frequently used technique is to precipitate gold from an aqueous chloroauric acid solution. This may be accomplished by use of active metals such as zinc, magnesium, iron, cadmium, lead, and bismuth. Also effective are inorganic reducing agents, such as ferrous sulfate, sodium sulfite, potassium sulfite sulfur dioxide and hydrogen peroxide, or organic reducing agents, such as formic acid and formaldehyde.

The characteristics of the gold powder, such as surface area, particle size, particle shape, bulk density and tendency to adsorb oil, among other, are dependent on the conditions of precipitation. Physical characteristics such as these influence the chemical processability and determine to a large extent the appearance, usefulness, and efficiency of the gold powder in particular applications. Thus, it is highly desirable to be able to control the physical characteristics of the powder by manipulation of the variables of the precipitation operation.

Poor appearance, manifested by a low level of brightness, and poor fireability of gold-printed metallizing compositions, manifested by fissuring and blistering upon firing, have long been problems in the electronics industry. These problems have been found to be related to the particle shape, size, and degree of agglomeration of the gold powders used. The process of this invention has been discovered to control particle agglomeration and thus provide a gold powder having a high level of brightness and good firing properties.

The prior art includes, for example, Short U.S. Pat. No. 3,717,481, issued Feb. 20, 1973, disclosing a reductive process for making spherical gold particles having a bulk density in the range 5–9 g/ml., by using as the reducing agent sodium and/or potassium sulfite. This powder, however, has a high-bulk density (due to particle agglomeration) which makes it unsatisfactory for some applications where light, non-lacey sintered gold films are required by the electronics industry.

The agglomeration of gold particles reductively precipitated from an aqueous solution might be expected to be controlled by the presence in the solution of a protective colloid, such as disclosed in U.S. Pat. No. 3,725,035, issued Apr. 3, 1973, which disclosed a process for precipitating gold using a protective colloid. Gum arabic was found most effective in that process, and methyl cellulose, sodium algenate, gum tragacanth and gelatin are also specifically disclosed. However, gold precipitated in the presence of gum arabic has not been found satisfactory for some electronic uses, since it often bubbles (and consequently affects the resultant pattern continuity) when fired above 900°C. (see Showing F below).

The use of gum arabic as a protective colloid in the precipitation of silver has also been disclosed in U.S. Pat. No. 3,201,223, issued t0 Cuhra et al. on Aug. 17, 1965.

Gelatin and methyl cellulose are described in U.K. Pat. No. 1,082,370 (page 2, line 65) as dispersing agents in precipitation of palladium, platinum, silver and gold (page 2, line 25) powders for electrical purposes. As indicated herein, however, gelatin has been found ineffective in producing nonbubbling, nonagglomerated golds.

Despite the fact that the above indicates to one skilled in the art that protective colloids, and especially gum arabic, are useful in reductive precipitation of noble metals, the results have been unsatisfactory for some uses. Accordingly, a process is needed to make finely divided nonagglomerated gold particles capable of producing over a wide firing temperature range fired (sintered) films of enhanced tightness and brightness, without bubbling during firing.

SUMMARY OF THE INVENTION

This invention provides an improved process for preparing finely divided gold powder by the reductive precipitation of gold from an aqueous solution of gold chloride. The improved process of this invention leads to susbtantially nonagglomerated fine gold powder of low bulk density, by virtue of adding polyvinyl alcohol to the aqueous solution. Polyvinyl alcohol is referred to herein as "PVA."

The amount of polyvinyl alcohol is an amount which is effective to reduce agglomeration of the gold precipitate, and may be in the range 0.1–10 grams PVA per liter of aqueous solution, preferably 0.3–3 grams PVA per liter of aqueous solution.

A preferred reducing agent is potassium sulfite, sodium sulfite, or mixtures thereof.

The substantially nonagglomerated gold powder produced by this process is often very useful in the electronics industry for printing patterns of gold on dielectric substrates, since the gold produced according to this process is fireable over a wide temperature range to films of enhanced brightness and physical continuity.

DETAILED DESCRIPTION OF THE INVENTION

The need filled by this invention was the discovery of a process for producing finely divided, nonagglomerated gold particles which are capable of being fired at elevated temperatures (above 900°C.) to produce tight, smooth, dense, bright films over a wide temperature range. Further, the separation of any colloid used must be easy to make the process practical, and the resultant powder should not bubble on being fired.

According to the process of this invention an acid gold chloride solution is mixed and reacted with reducing agent(s) in the presence of PVA as a protective colloid, to prevent the precipitated gold particles from agglomerating. There may optionally be added an easily removable defoaming agent to control foaming caused by boiling and/or evolution of gaseous by-product from the decomposition of the reducing agent. The most suitable reaction temperature range is from approximately room temperature to 100°C.

A commercially practical source of gold for the precipitation reaction is a chloroauric acid solution, also known as a gold chloride or acid gold chloride solution. A suitable solution of this kind may be prepared according to well-known procedures by dissolving gold metal in aquea regia so as to produce a solution containing approximately 1–50 percent metallic gold by weight. Numerous reducing agents will precipitate gold from such a solution including oxalic acid and salicylic acid; water-soluble salts, such as alkali metals salts, of these acids; hydroquinone, including also substitued hydroquinones such as bromo- and chloro-hydroquinone and lower alkyl substituents such as methyl- and dimethyl-hydroquinone; sodium and potassium sulfites, and mixtures. The sulfites are preferred.

When each reducing agent is used alone, the concentration of the reducing agent is not critical; however, it is preferred that an excess amount of reducing agent be present in order to bring the reaction essentially to completion. In using combinations of reducing agents, e.g., either oxalic acid and/or salicylic acid with hydroquinone as in U.S. Pat. No. 3,725,035, the ratio of the acid to the hydroquinone may be very important; the total amount of acid necessary for best results is at least ten times the amount of hydroquinone. In any event, one skilled in the art will select the appropriate relative quantities of reducing where several are used. Here also, the total quantity of reducing agent is not critical but an excess over the stoichiometrically required quantity is preferred in order to bring the reduction reaction essentially to completion.

Although agitation is not absolutely essential to the success of the process, some agitation is desirable, as in most chemical processes, to secure good intermixing of the ingredients.

After reaction, the gold powder may be recovered from the slurry by any of the common techniques for separating particulate solids from the mother liquor, appropriate techniques include filtration, decantation, and centrifugation. The recovered powder should be thoroughly washed with water to remove by-product salts, residual protective colloid, and defoaming agent (if used). The water wash should be followed by a thorough wash with a water-miscible organic solvent, such as methanol, to remove all water and oxidation products of the reducing agents (e.g, quinhydrone when hydroquinones are used) and to facilitate drying. Drying may then be accomplished by any convenient means.

The essence of the present invention is to maintain the particulate form of gold precipitate by the use of a PVA as a protective colloid, thus impeding agglomeration of the powder particles and yielding a powder from which the colloid can be easily separated by washing. The concentration of PVA colloid useful in this invention is approximately 0.1–10 grams/liter, and preferably 0.3–3.0 grams/liter.

Polyvinyl alcohol (PVA) is commercially available as nearly completely hydrolyzed polyvinyl acetate. Thus, Elvanol polyvinyl is available from E. I. du Pont de Nemours and Company, Wilmington, Delaware, in various grades wherein 87–99.8 percent, depending upon the grade, of the acetate groups in the unit $[CH_2CH(OCOCH_3)]$ are hydrolyzed to form the unit $(CH_2CHOH)$. Thus, the terms polyvinyl alcohol and PVA as used herein refer to PVA and polyvinyl acetate in which at least 50 percent of the acetate groups have been hydrolyzed to hydroxyl groups (OH).

Addition of even relatively small amounts of PVA protective colloid to the acid gold chloride solution may tend to increase the solution viscosity. Thus, the evolution of gas from the oxidation of the oxalic acid may tend to cause frothing, which must be controlled. Another possible cause of bubble and froth formation is localized overheating and boiling of the reaction mixture. Any of numerous antifoam agents would be effective in controlling the froth. However, residual amounts of antifoaming agents may tend to remain adsorbed on the gold particles after washing and lead to very poor firing properties of metallizing compositions which are subsequently prepared from the gold powder. The preferred antifoam agents are, therefore, those which do not remain adsorbed on the gold particles. Octyl alcohol is typical of this type antifoam agent. Of course, other similarly removable defoaming agents would also be useful; or mechanical, electrical, or ultrasonic means known to the art may be employed to break up the foam.

The invention is illustrated by the following data. In the examples and elsewhere in the specification all parts, percentages and proportions of material or components are by weight.

EXAMPLE 1

Gold was prepared by the process of this invention, as follows. Distilled water, 1485 ml., was added to a four-liter beaker, then 15 ml. of a 5 percent aqueous solution of Du Pont Elvanol 50–42 "partially hydrolyzed" polyvinyl alcohol was added to the four-liter beaker (about 88 percent of the acetate groups are hydrolyzed to alcohol groups). A gold chloride solution containing a total gold content of 2.0 troy ounces in about 125 ml. of solution was added. The solution was continuously mildly agitated at 25°C. A solution of 140 grams of potassium sulfite in 400 ml. of distilled water (room temperature) was added to the solution gradually over a period of 20 seconds, causing precipitation. The concentration of PVA in the resultant solution was about 0.7 g./l. The temperature rose to 34°C. after one minute, and then gradually started falling, indicating that reaction was complete. Solid sodium carbonate (150 grams) was added gradually to the solution to neutralize it.

The precipitated gold powder was washed by decantation of seven successive hot distilled water washed of about 1,500 ml. each, and then by two decantation washes with methanol (about 1,500 ml. each). The powder was dried and screened through a 200 mesh screen (U.S Standard Sieve Scale).

The gold powder was observed to be nonagglomerated and was found to have a solids content (750°C. ignition) of 99.89 percent, a surface area of 0.55 m.$^2$/g., and a bulk density of 3.8 g./ml. A thick film printing composition was formulated from the gold using (weight percent): 80.3 percent gold powder, 3.7 percent glass powder, 13.0 percent ethyl cellulose/terpene vehicle, and 3.0 percent hydrogenated castor oil. The glass powder was a lead aluminoborosilicate containing about 10 percent $SnO_2$.

The above ingredients were mixed and milled into a smooth printable paste. The paste was screen printed through a 200 mesh screen pattern onto 1 × 1 inch alumina substrates, air dried for about 10 minutes, and oven dried at 150°C. for about 10 minutes. Four of the printed substrates were fired in a temperature gradient furnace to a maximum temperature of 1010°C. No bubbles or blisters developed throughout the temperature range. Satisfactory fired film brightness was observed starting at about 850°C., improving as the temperature went higher. Several parts were fired through a one-hour belt furnace cycle reaching a peak temperature of 850°C. They were smooth, dense, and had a satisfactory gold luster.

Comparative Showings

The failure of other protective colloids, suggested by the art, to produce the results obtained by applicant's invention, is seen in the following Comparative Showings.

Showings A, B, and C

Gold was reductively precipitated (with ferrous sulfate) from an aqueous solution of gold chloride using as the protective colloid, not the PVA of the present invention, but (A) gum arabic, (B) gelatin, and (C) sodium caseinate, respectively.

A solution of 318 grams ferrous sulfate reductant, 36 concentrated HCl and 500 ml. water was prepared and 420 ml. thereof was mixed with 8 g. gum arabic (A). The resultant mixture was heated with stirring until a solution had formed, then cooled to room temperature. Over a 10-minute period 200 ml. of a gold chloride solution containing 40 g. gold was added with stirring. Stirring was continued for 5 minutes, then the precipitate was allowed to settle and washed twice with about 500 ml. of hot water and four times with about 500 ml. of methanol. The resultant gold had a surface area of 0.5 m.$^2$/g. and a bulk density of 4.35 g./ml. The gold powder upon being printed and fired (850°C.) on a substrate exhibited a dull appearance. The fired product was lacey and very dull, contrasted with the tight bright film of Example 1. It is thought that microagglomeration in the gold powder of (A) causes the inferior properties of the resultant fired film.

Similar runs using as the colloid (B) gelatin and (C) sodium caseinate resulted in formation of a gelatinous mass.

Showing D

Polyvinyl pyrrolidone (PVP), another commonly used colloid, was used as the colloid in reductive precipitation of gold from an aqueous solution of the chloride. An agglomerated gold, firing to a dull film, was produced.

Hot tap water (2.6 liters) was added to a 20 liter reaction flask and heated to 88°C.; 3 g. hydroquinone and 76 g. oxalic acid, as reductants, and 32 g. PVP (45 percent aqueous solution) were added to the flask, which was then heated to 96°C.; 62 g. Au as gold chloride solution (113 cc.) acidified further with 10 g. concentrated HCl, plus 10 cc. octyl alcohol to control foaming, were added. The precipitated gold powder was washed twice with hot tap water. The gold powder was washed twice with methanol, once with kerosene to remove gummy excess PVP between the methanol washes. After final decantation residual methanol was removed from the gold powder by vacuum drying at 50°-90°C.; 40 grams of the dried powder was put through a 200-mesh screen.

The resultant powder was analyzed with the following results: solids content (750°C. ignition), 99.84 percent; surface area, 0.28 m.$^2$/g.; and bulk density, 4.6 g./cc. A thick-film composition was formulated from 8.0 g. Au powder, 0.37 g. lead tin aluminosilicate glass powder, 0.30 g. hydrogenated castor oil, and 1.30 g. medium of ethyl cellulose and terpineol. The ingredients were mixed and milled to make a smooth printable paste. The paste was screen-printed through a 200-mesh screen pattern onto 1 × 1 inch alumina substrates, air dried for about 10 minutes, and dried in a 150°C. oven for about 10 minutes.

Four of the pars were fired in temperature gradient furnance to a maximum temperature of 988°C. No bubbles or blister developed at the maximum temperature, but the fired films were very dull. Several of the parts were fired through a 1 hour belt furnace cycle, reaching a peak temperature of 850°C.; the fired appearance was lumpy and dull.

The action of polyvinyl pyrrolidone (PVP) as a protective colloid agent for the gold powder was not satisfactory because it hampered the washing process and gave a gold paste product that fired out lumpy and dull in appearance.

Showing E

Agglomerated spherical gold particles were made according to the process of the above-mentioned U.S. Pat. No. 3,717,481, and then used to print and fire a gold film, which was observed to be dull in appearance.

The spherical gold powder, not of the present invention, was made by mixing in a 4-liter glass jar 1.5 liters distilled water, 4 ml. of 37 percent hydrochloric acid, and 125 ml. gold chloride solution, which contained a total of 2.0 troy ounces of gold. The mixture was mildly agitated at room temperature. A solution of 140 g. potassium sulfite in 300 ml. distilled water was added gradually to the jar at a rate of about 20 ml. per minute. After reductive precipitation was complete, the solution was decanted and the gold precipitate was washed with 2 one-liter portions of hot distilled water. The gold powder was further washed using 15 portions of 30 ml. each of hot distilled water. The gold was then washed with five 30 ml. portions of methanol and then dried in an air oven at 125°C.

The gold powder had a surface area of 0.3 m.$^2$/g. and a bulk density of about 5 g./cc. A gold paste was prepared as in Example 1 and printed on a substrate as in Example 1. The fired gold film was dull and lacey in appearance.

Showing F

A gold powder of flakes and spheres was precipitated using gum arabic as a protective colloid, as disclosed in U.S. Pat. No. 3,725,035, mentioned above. Upon firing, a pattern of this powder was observed to bubble. The experimental details were as follows.

One liter of water was mixed with 5.3 g. of gum arabic, 27 g. of oxalic acid, and 2.7 g. of hydroquinone. The mixture was subjected to mild agitation and heated to approximately 97°C.; 108 g. of gold chloride solution containing 27 g. of gold was added. Bubbling resulted from gas evolved by the oxidation of oxalic acid, and octyl alcohol was added as required to control foam formation. A precipitate began to form immediately and the reaction was essentially complete in about 15 minutes; however, the mixture was retained intact for approximately 1 hour to ensure completion of the reaction. The precipitated gold powder was filtered, washed, and dried. Microscopic examination of the powder revealed spherical particles approximately 0.5–2 microns in diameter with randomly interspersed hexagonal and triangular flakes approximately 1–15 microns across their widest flat surface.

A metallizing composition was prepared from the gold powder. The composition contained 84 percent gold powder, 2 percent of finely divided lead-borate glass frit composed of approximately 83 percent lead oxide and 17 percent boron trioxide, and 14 percent of a vehicle consisting of 10 percent hydrogenated resin, 10 percent ethyl hydroxethyl cellulose, 40 percent beta-terpineol, 20 percent kerosene and 20 aliphatic hydrocarbon fraction boiling higher than kerosene.

A pattern was printed on an alumina substrate using this composition and inserted into a box furnace at room temperature. The temperature of the furnace was raised at 15°C./min. to 900°C. and the sample removed. The printed portion was found to be severely bubbled or blistered and was unsuitable as a printed circuit.

I claim:

1. In a process for preparing finely divided gold powder by reductive preciptiation of gold from an aqueous solution of gold chloride, the improvement of adding to the aqueous solution of an amount of polyvinyl alcohol effective to reduce agglomeration of the gold precipitate, whereby a substantially nonagglomerated fine gold powder of reduced bulk density is produced, which is fireable over a wide temperature range to films of enhanced brightness and continuity.

2. A process according to claim 1 wherein the reducing agent is potassium sulfite, sodium sulfite, or mixtures thereof.

3. A process according to claim 1 wherein there is 0.1–10 grams PVA/liter of aqueous solution.

4. A process according to claim 3 wherein there is 0.3–3 grams PVA/liter aqueous solution.

* * * * *